Nov. 18, 1941.    V. C. GRUSH    2,263,539
SOLDERING LUG
Filed May 3, 1939
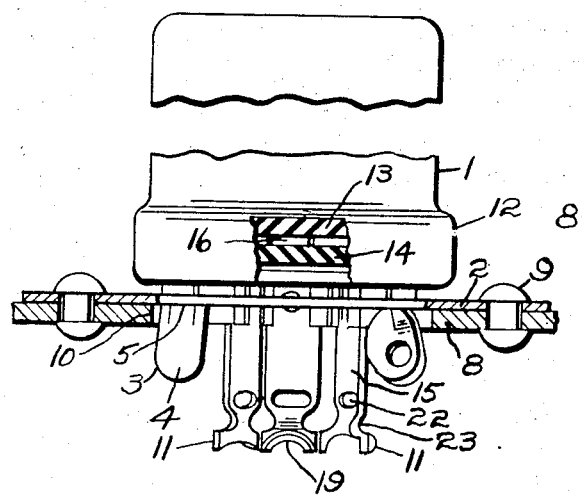
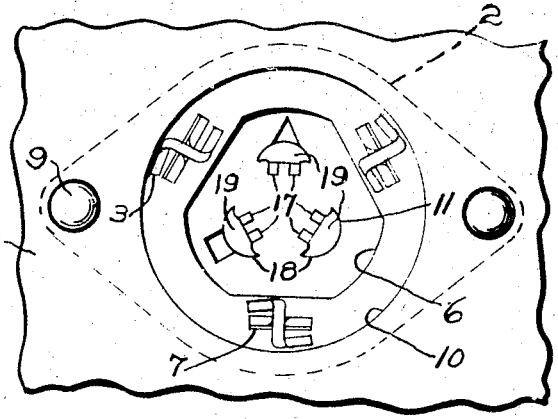
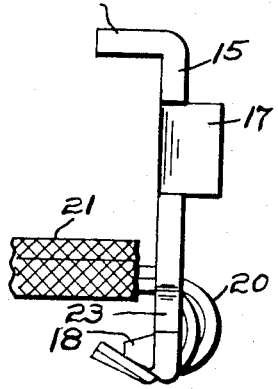
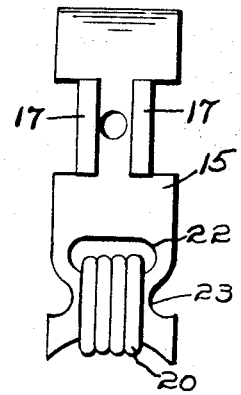
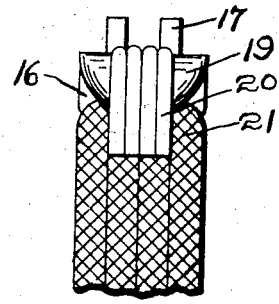
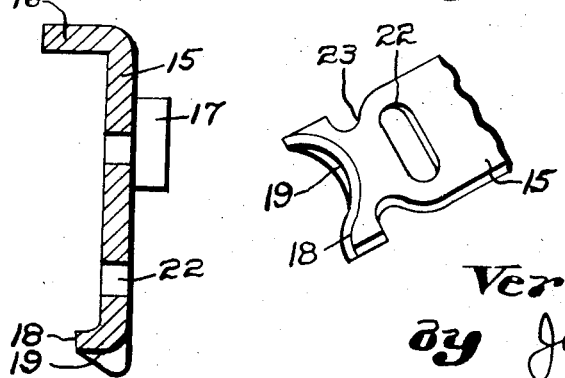
Inventor:
Vernon C. Grush.
By John Todd
Att'y.

Patented Nov. 18, 1941

2,263,539

UNITED STATES PATENT OFFICE 2,263,539

SOLDERING LUG

Vernon C. Grush, Downers Grove, Ill., assignor to Cinch Manufacturing Corporation, Chicago, Ill., a corporation of Illinois Application May 3, 1939, Serial No. 271,616

1 Claim. (Cl. 173—324)

This invention relates to improvements in soldering lugs of the type used in connection with certain units of electrical apparatus.

The chief object of my invention relates to an improved soldering lug of simple construction having novel features facilitating soldering of a lead wire or wires thereto.

Other objects and features of my invention will be apparent from inspection of the drawing and specification hereinbelow set forth.

Referring to the drawing, in which I have illustrated a preferred embodiment of my invention:

Fig. 1 is a front plan view partly in section of an electrical installation embodying my invention;

Fig. 2 is a bottom plan view of the installation shown in Fig. 1;

Fig. 3 is a side elevation of my improved soldering lug per se showing a preferred method of assembling lead wires with the lug prior to soldering the wires permanently thereto;

Fig. 4 is a rear plan view of the lug installation shown in Fig. 3;

Fig. 5 is a bottom plan view of the installation shown in Figs. 3 and 4;

Fig. 6 is a bottom plan view of my improved soldering lug with the lead wires omitted;

Fig. 7 is a sectional view taken along the line 7—7 of Fig. 6; and

Fig. 8 is a perspective view of a portion of my improved lug.

Referring to my preferred installation illustrated in Figs. 1–3, I have shown an electrical unit such as a condenser can 1 secured in spaced relation to a support such as a mounting plate 2 by means of an attaching member 3 assembled with the condenser can adjacent its lower end and providing a plurality of projecting portions 4 projecting beyond the lower end of the can and through the plate 2 and providing means engaging the rear face 5 thereof. The mounting plate 2, which may be of metal or plastic material, has a central opening 6 and a plurality of narrow openings 7 disposed around the opening 6 for receiving the projecting portions 4. The mounting plate 2 is in turn secured to a panel 8, which may be a part of a radio set, by any suitable means such as the rivets 9. The panel 8 has an opening 10 in alignment with the opening 6. My improved soldering terminals 11, adapted to be electrically connected with the condenser body (not shown) by suitable connecting leads (not shown) extend from the lower end of the condenser can 1 through the opening 6 of the mounting plate and the opening 10 of the support 8. The condenser can 1 has a peripheral flange 12 adjacent its lower end within which are maintained a pair of insulating plates 13 and 14 (Fig. 1).

The mounting means or attaching member 3 for securing the condenser can 1 to a support forms no part of my present invention as it belongs to another inventor who has filed an application on the same. The attaching member 3 has been illustrated and described herein merely incidentally to the detailed description of the type of electrical unit with which my soldering lugs are preferably used.

Referring in detail to my preferred construction of the soldering terminals 11, I have shown one which is made from one piece of sheet metal and comprises a relatively flat body portion 15. An attaching means in the form of a flange or foot portion 16 integrally joined to one end of the body portion extends in right-angular relation to the normal plane thereof, as most clearly shown in Figs. 3 and 7. The foot portion 16 is adapted to be held between the insulating plates 13 and 14, as shown in Figs. 1 and 3, so as to maintain the terminal in assembly with the condenser can and in upright position. A pair of spaced wing portions 17 integrally joined to opposed side edges of the body portion 15 extend out of the normal plane of the body portion on one side thereof. The wing portions 17 are adapted to be bent to embrace a connecting lead (not shown) between the foil of the condenser and the soldering terminal after which, if it is desired, the connecting lead may be soldered permanently to the body of the terminal. The connecting leads are adapted to extend from the foil of the condenser through openings (not shown) in the insulating plates 13 and 14 so as to be disposed intermediate the respective pairs of wings 17, after which the wings are bent to embrace the same. Integral with the opposite end of the body portion 15 from the foot portion 16 I have provided an outwardly-extending wire-supporting means or lip portion 18. The lip portion extends beyond one side of the body portion and has a lower open face 19 adapted to support the bare wires 20 on the leads 21 so that the bare wires may be soldered thereto. The lower face 19 is preferably of concave shape in longitudinal cross-section providing a pocket for receiving the wires 20 so that they will naturally bunch close together prior to application of solder thereto, as most clearly shown in Figs. 4 and 5.

A preferred method of applying the wires 20 to the soldering terminals is carried out either by extending them through an opening 22 of the body portion 15, as shown in Fig. 4, and then bending them to dispose portions of the same near their free ends within the concave surface 19 or by wrapping them around notches 23 prior to disposing them within the concavity. The wires 20 are permanently secured to the terminals by applying solder to the terminals at the lip 18.

As a result of the particular construction of my improved terminal wherein I have provided the concave lip portion 18, a desirable terminal is effected through reason of the fact that the bare wires of the leads may be held in close proper relationship until ready to be soldered thus avoiding becoming unduly separated or even slipping from place. Also, the open face 19 offers a substantial amount of surface to which the wires may be easily soldered. Finally, the lip portion permits a visible inspection of the soldered connection from a point immediately beneath the lip. This last feature greatly facilitates inspection of wire connections in radio sets during final checking prior to sale or upon repair.

Although I have set out the preferred use of my improved soldering terminals in connection with an electrolytic condenser, it is understood that the lugs may be used in combination with other forms of electrical units of manufacture.

Although I have illustrated and described a preferred embodiment of my invention, I do not wish to be limited thereby because the scope of my invention is best defined by the following claim.

I claim:

A soldering terminal having an elongated body portion, attaching means adjacent the upper end of said body portion for attaching said terminal to a supporting means, said body portion having means adjacent the lower end receiving lead wires prior to soldering said wires to said terminal, and a lip portion integral with the lower end of said body portion for receiving and supporting said wires and extending transverse to the length of said body portion, said lip portion having a lower open surface extending in angular relation to said body portion to which solder may be applied to secure said wires to said terminal, and said lower surface of said lip portion being concave in shape thereby to hold said wires closely together prior to application of said solder thereto.

VERNON C. GRUSH.